(12) United States Patent
Hinz

(10) Patent No.: US 9,550,401 B2
(45) Date of Patent: Jan. 24, 2017

(54) IFS INCLUDING STRUT PIVOTALLY SECURED TO CHASSIS THROUGH TORQUE TUBE ASSEMBLY

(71) Applicant: Reyco Granning, LLC, Mount Vernon, MO (US)

(72) Inventor: John A Hinz, Monticello, IN (US)

(73) Assignee: Reyco Granning, LLC, Mount Vernon, MO (US)

( * ) Notice: Subject to any disclaimer, the term of this patent is extended or adjusted under 35 U.S.C. 154(b) by 0 days.

(21) Appl. No.: 14/684,721

(22) Filed: Apr. 13, 2015

(65) Prior Publication Data

US 2016/0297268 A1 Oct. 13, 2016

(51) Int. Cl.
| | |
|---|---|
| *B60G 3/06* | (2006.01) |
| *B60G 11/27* | (2006.01) |
| *B62D 7/18* | (2006.01) |
| *B60G 21/02* | (2006.01) |
| *B60G 7/00* | (2006.01) |
| *B60G 7/02* | (2006.01) |

(52) U.S. Cl.
CPC ............... *B60G 3/06* (2013.01); *B60G 7/001* (2013.01); *B60G 7/02* (2013.01); *B60G 11/27* (2013.01); *B60G 21/026* (2013.01); *B62D 7/18* (2013.01); *B60G 2200/142* (2013.01); *B60G 2202/152* (2013.01); *B60G 2204/128* (2013.01); *B60G 2206/10* (2013.01)

(58) Field of Classification Search
CPC ............ B60G 3/06; B60G 7/02; B60G 11/27; B60G 7/18; B60G 7/001; B60G 21/026; B60G 2204/128; B60G 2200/142; B60G 2206/10; B60G 2202/152

USPC .................................................. 280/124.106
See application file for complete search history.

(56) References Cited

U.S. PATENT DOCUMENTS

| | | |
|---|---|---|
| 2,018,653 A | 11/1933 | Best |
| 2,842,230 A | 10/1955 | MacPherson |
| 2,757,016 A | 7/1956 | Adolff et al. |
| 2,856,198 A | 10/1958 | Muller |
| 2,916,296 A | 12/1959 | Muller |
| 2,935,334 A | 5/1960 | Felts |
| 2,967,066 A | 1/1961 | Mueller |
| 3,037,787 A | 6/1962 | Gottschald |
| 3,156,481 A | 11/1964 | Dangauthier |
| 3,333,653 A | 8/1967 | Eirhart, Jr. |
| 3,346,272 A | 10/1967 | Smith |
| 3,430,977 A | 3/1969 | Riehl |
| 3,462,168 A | 8/1969 | Gebler |
| 3,490,785 A | 1/1970 | Moss |

(Continued)

*Primary Examiner* — Karen Beck
(74) *Attorney, Agent, or Firm* — George Pappas

(57) ABSTRACT

An Independent Front Suspension (IFS) assembly having a single lower control arm having an inboard end pivotally secured to a chassis support structure, an air spring supported by an air spring seat relative to the lower control arm, a strut having an upper end pivotally secured to the chassis support structure and a lower end coupled to the lower control arm outboard end, and a steering knuckle fixed to the strut lower end, the steering knuckle disposed below the lower air spring seat and whose rotative movement about the strut axis is unconfined by proximity between the steering knuckle and the lower air spring seat, whereby available wheel cut is maximized. Also an IFS module including right and left side IFS assemblies and adapted for installation into a vehicle.

15 Claims, 10 Drawing Sheets

(56) References Cited

U.S. PATENT DOCUMENTS

| | | | |
|---|---|---|---|
| 3,560,016 | A | 2/1971 | Bundorf |
| 3,573,880 | A | 4/1971 | Sakai |
| 3,703,215 | A | 11/1972 | Takahashi |
| 3,727,940 | A | 4/1973 | Hug |
| 3,733,087 | A | 5/1973 | Allison |
| 3,926,454 | A | 12/1975 | Van Winsen |
| 3,941,401 | A | 3/1976 | Allison |
| 3,957,128 | A | 5/1976 | Le Salver et al. |
| 4,084,837 | A | 4/1978 | Milner |
| 4,111,456 | A | 9/1978 | Arnold et al. |
| 4,159,125 | A | 6/1979 | Buchwald |
| 4,206,907 | A | 6/1980 | Harrod |
| 4,210,343 | A | 7/1980 | Shiomi et al. |
| 4,213,631 | A | 7/1980 | Wilkerson |
| 4,260,177 | A | 4/1981 | Pflughaupt et al. |
| 4,274,654 | A | 6/1981 | Travaglio |
| 4,286,802 | A | 9/1981 | Roche |
| 4,321,988 | A | 3/1982 | Bich |
| 4,341,396 | A | 7/1982 | Decouzon et al. |
| 4,366,969 | A | 1/1983 | Benya et al. |
| 4,480,852 | A | 11/1984 | Rumpel |
| 4,515,391 | A | 5/1985 | Koide |
| 4,555,096 | A | 11/1985 | Pryor |
| 4,610,461 | A | 9/1986 | Guzzetta |
| 4,620,720 | A | 11/1986 | Sakata et al. |
| 4,648,623 | A | 3/1987 | Cameron |
| 4,653,772 | A | 3/1987 | Sautter |
| 4,655,438 | A | 4/1987 | Cameron |
| 4,662,615 | A | 5/1987 | Paton |
| 4,712,776 | A | 12/1987 | Geno et al. |
| 4,763,920 | A | 8/1988 | Huidekoper |
| 4,778,198 | A | 10/1988 | Gold |
| 4,826,204 | A | 5/1989 | Cameron |
| 4,828,232 | A | 5/1989 | Harrod et al. |
| 4,911,466 | A | 3/1990 | Blair |
| 4,961,594 | A | 10/1990 | Pees |
| 4,963,759 | A | 10/1990 | Leonti et al. |
| 4,966,384 | A | 10/1990 | Endo et al. |
| 4,974,872 | A | 12/1990 | Riese |
| 5,009,401 | A | 4/1991 | Weitzenhof |
| 5,192,100 | A | 3/1993 | Rumpel et al. |
| 5,228,717 | A | 7/1993 | Perkins |
| 5,301,932 | A | 4/1994 | Shibaya |
| 5,451,073 | A | 9/1995 | Inoue |
| 5,845,918 | A * | 12/1998 | Grinde .................. B60G 9/00 280/124.1 |
| 6,305,701 | B1 | 10/2001 | Bobinger et al. |
| 6,382,602 | B1 | 5/2002 | Morrow |
| 6,676,145 | B2 | 1/2004 | Carlstedt et al. |
| 6,893,033 | B2 | 5/2005 | Dean et al. |
| 7,140,625 | B2 | 11/2006 | Dean |
| 7,185,902 | B1 | 3/2007 | Lloyd |
| 7,370,869 | B2 | 5/2008 | Kang |
| 7,384,053 | B1 | 6/2008 | Boecker et al. |
| 7,950,680 | B2 * | 5/2011 | Christensen ............ B60G 3/26 280/124.135 |
| 8,152,185 | B2 | 4/2012 | Siebeneick |
| 8,899,372 | B1 * | 12/2014 | Vey ..................... B60G 3/20 180/312 |
| 2002/0056969 | A1 | 5/2002 | Sawai et al. |
| 2007/0075517 | A1 * | 4/2007 | Suhre ................... B60G 3/20 280/124.134 |
| 2007/0170683 | A1 * | 7/2007 | Shimizu ................ B60G 3/20 280/124.135 |
| 2009/0212523 | A1 * | 8/2009 | Koschinat ............ B60G 7/001 280/124.111 |
| 2011/0042908 | A1 * | 2/2011 | Nolin ................... B60G 11/56 280/6.157 |
| 2015/0298518 | A1 * | 10/2015 | Andersson ............ B60G 3/20 280/86.5 |

* cited by examiner

IFS INCLUDING STRUT PIVOTALLY SECURED TO CHASSIS THROUGH TORQUE TUBE ASSEMBLY

BACKGROUND

The present disclosure relates to vehicle suspension systems, particularly independent front suspension ("IFS") assemblies.

IFS assemblies employing struts, which are capable of supporting a side load and typically provide damping capabilities, are well known. It is also known to provide an IFS assembly including struts that provide upward support axially therealong, and such suspensions typically employ a single lower control arm. Moreover, it is known to employ air springs with such struts. For example, MacPherson type strut IFS assemblies wherein an air spring is located above and generally in line with the strut are disclosed by U.S. Pat. Nos. 4,206,907; 4,655,438; 4,974,872;. and 6,382,602. Of these patents, the '907. and '602. patents also disclose varying the air spring pressure for load and ride height adjustment purposes.

Further examples of MacPherson type strut IFS assemblies in which coil springs and leaf springs are located between a single lower control arm and the vehicle chassis are disclosed by U.S. Pat. Nos. 2,018,653; 2,842,230; 2,967, 066; 3,333,653; 3,926,454;. and 4,653,772.

It is also known to provide MacPherson type strut IFS assemblies wherein the steering knuckle includes an arm portion extending below and transferring the load to the strut, as disclose, for example, in U.S. Pat. No. 5,192,100.

It is desirable to reduce loading of both struts and air springs in an IFS assembly, to maximize the available wheel cut of an IFS assembly, to simplify vehicle suspension installations by OEM manufacturers, provide variable load-carrying and right height capabilities, and provide other advancements in areas of IFS technologies and configurations.

SUMMARY

The present disclosure beneficially provides such advancements.

According to a first aspect, the present disclosure provides an IFS assembly including a single lower control arm having laterally-spaced inboard and outboard ends, the inboard end adapted to be pivotally secured to a chassis support structure. A lower air spring seat is supported by the lower control arm, the lower air spring seat adapted to upwardly support the chassis support structure relative to the lower control arm through an air spring engaging the chassis support structure. The IFS assembly includes a strut having upper and lower ends disposed along a strut axis, the strut upper and lower ends having relative movement along and about the strut axis. The strut upper end is adapted to be pivotally secured to the chassis support structure and the strut lower end is coupled to the lower control arm outboard end. A steering knuckle is rotatably and axially secured to the strut lower end, the steering knuckle disposed below the lower air spring seat and has rotative movement about the strut axis that is unconfined by proximity between the steering knuckle and the lower air spring seat and/or the air spring through which the lower air spring seat is adapted to support the chassis support structure. Consequently, available wheel cut is maximized.

According to a second aspect, the present disclosure provides an IFS assembly including a chassis support structure and a single lower control arm having laterally-spaced inboard and outboard ends, the inboard end pivotally secured to the chassis support structure. A lower air spring seat is supported by the lower control arm, and an air spring is supported by the lower air spring seat and engages the chassis support structure. The chassis support structure is upwardly supported by the air spring relative to the lower air spring seat. The IFS assembly includes a strut having upper and lower ends disposed along a strut axis, the strut upper and lower ends having relative movement along and about the strut axis. The strut upper end is pivotally secured to the chassis support structure, and the strut lower end is coupled to the lower control arm outboard end. A steering knuckle is rotatably and axially secured to the strut lower end and is disposed below the lower air spring seat. The steering knuckle has rotative movement about the strut axis that is unconfined by proximity between the steering knuckle and the lower air spring seat. Consequently, available wheel cut is maximized.

According to a third aspect, the present disclosure provides an IFS assembly including a single lower control arm defining laterally-spaced inboard and outboard ends, the inboard end adapted to be pivotally secured to a chassis support structure. The IFS assembly includes a strut having upper and lower ends disposed along a strut axis, the strut upper and lower ends having relative movement along and about the strut axis. The strut upper end is adapted to be pivotally secured to the chassis support structure. The IFS assembly includes a steering knuckle including a strut supporting portion affixed to and supporting the strut lower end, and a load arm extending below and secured to the lower control arm. The outboard end of the lower control arm is disposed between the load arm and the strut lower end, and the lower control arm is upwardly supported by the load arm.

According to a fourth aspect, the present disclosure provides an IFS assembly including a chassis support structure and a single lower control arm defining laterally-spaced inboard and outboard ends, the inboard end pivotally secured to the chassis support structure. The IFS assembly includes a strut having upper and lower ends disposed along a strut axis, the strut upper and lower ends having relative movement along and about the strut axis. The strut upper end is pivotally secured to the chassis support structure. The IFS assembly includes a steering knuckle including a strut supporting portion affixed to and supporting the strut lower end, and a load arm extending below and secured to the lower control arm. The outboard end of the lower control arm is disposed between the load arm and the strut lower end, and the lower control arm is upwardly supported by the load arm.

According to a fifth aspect, the present disclosure provides an IFS assembly including a single lower control arm defining laterally-spaced inboard and outboard ends, the inboard end adapted to be pivotally secured to a chassis support structure, and a steering knuckle secured to the lower control arm outboard end. The IFS assembly includes a strut having upper and lower ends disposed along a strut axis, the strut upper and lower ends having relative movement along and about the strut axis. The strut lower end is fixed relative to the steering knuckle, and the strut upper end provided with a clevis ring structure adapted to surround a bushing extending therethrough. The strut upper end is adapted to be pivotally secured to the chassis support structure through the clevis ring structure and the bushing about a generally horizontal first axis.

According to a sixth aspect, the present disclosure provides an IFS assembly including a chassis support structure and a single lower control arm defining laterally-spaced inboard and outboard ends, the inboard end pivotally secured to the chassis support structure. A steering knuckle is secured to the lower control arm outboard end. The IFS assembly includes a bushing and a strut having upper and lower ends disposed along a strut axis, the strut upper and lower ends having relative movement along and about the strut axis. The strut lower end is fixed relative to the steering knuckle, and the strut upper end provided with a clevis ring structure. The bushing extends through and is surrounded by the clevis ring structure, and the strut upper end is pivotally secured to the chassis support structure through the clevis ring structure and the bushing about a generally horizontal first axis.

According to a seventh aspect, the present disclosure provides an IFS assembly including a single lower control arm having laterally-spaced inboard and outboard ends, the inboard end adapted to be pivotally secured to a chassis support structure, and a steering knuckle secured to the lower control arm outboard end. The IFS assembly includes a strut having upper and lower ends disposed along a strut axis, the strut upper and lower ends having relative movement along and about the strut axis. The strut lower end is fixed relative to the steering knuckle. A torque tube assembly includes an elongate torque tube extending between first and second joints at which the torque tube is adapted to be rigidly fixed relative to the chassis support structure, and an upper strut mount having laterally-spaced first and second ends. The first end is rigidly affixed to the torque tube between the first and second joints. The strut upper end is adapted to be pivotally secured to the second end.

According to an eighth aspect, the present disclosure provides an IFS assembly including a chassis support structure having a first portion and a torque tube assembly, and a single lower control arm having laterally-spaced inboard and outboard ends. The inboard end is pivotally secured to the chassis support structure first portion, and a steering knuckle is secured to the lower control arm outboard end. The IFS assembly includes a strut having upper and lower ends disposed along a strut axis, the strut upper and lower ends having relative movement along and about the strut axis. The strut lower end is fixed relative to the steering knuckle. The torque tube assembly includes an elongate torque tube extending between first and second joints at which the torque tube is rigidly fixed relative to the chassis support structure first portion, and an upper strut mount having laterally-spaced first and second ends. The first end is rigidly affixed to the torque tube between the first and second joints, and the strut upper end is pivotally secured to the second end.

According to a ninth aspect, the present disclosure provides an IFS module adapted for installation into a vehicle. The IFS module includes a chassis support structure having laterally opposite right and left sides, and adapted for attachment to the vehicle frame. The IFS module includes a pair of left and right side single lower control arms, each lower control arm defining laterally-spaced inboard and outboard ends, and each inboard end is pivotally secured to the chassis support structure. The IFS module includes a pair of left and right side struts, each strut having upper and lower ends disposed along a respective strut axis, the upper and lower ends of each strut having relative movement along and about the respective strut axis. The strut upper ends are pivotally secured to the chassis support structure. The IFS module also includes a pair of left and right side steering knuckles, each steering knuckle fixed relative to the respective strut lower end and secured to the respective lower control arm outboard end.

BRIEF DESCRIPTION OF THE DRAWINGS

The various objects, features and attendant advantages of the present invention will become fully appreciated as the same becomes better understood when considered in conjunction with the accompanying drawings, wherein like reference characters designate the same, similar or corresponding parts throughout the several views.

DETAILED DESCRIPTION

Figure 1:
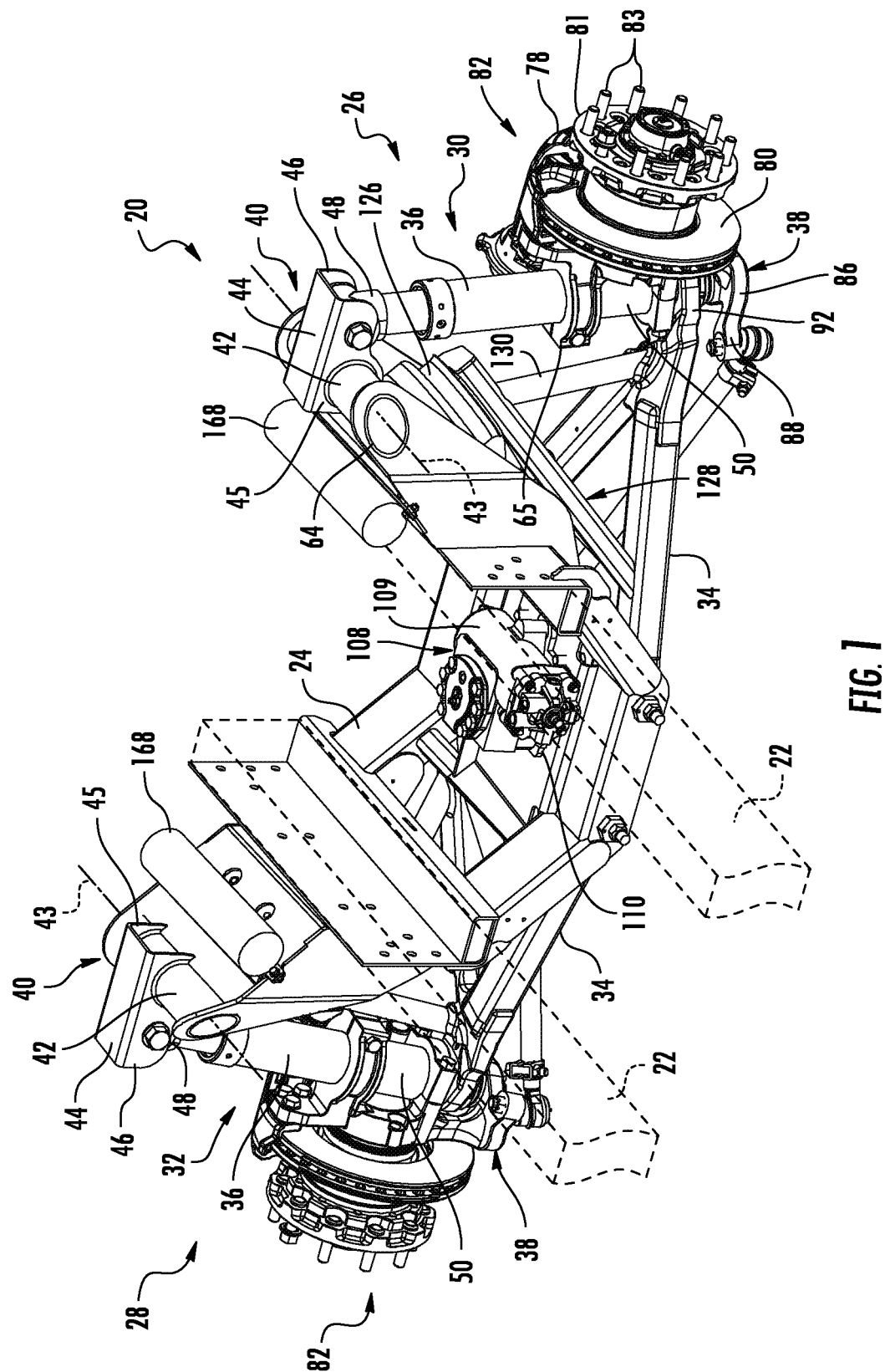
FIG. 1 is a rear, upper perspective view of an IFS module incorporating right and left side IFS assemblies according to an embodiment of the present disclosure.
Figure 2:
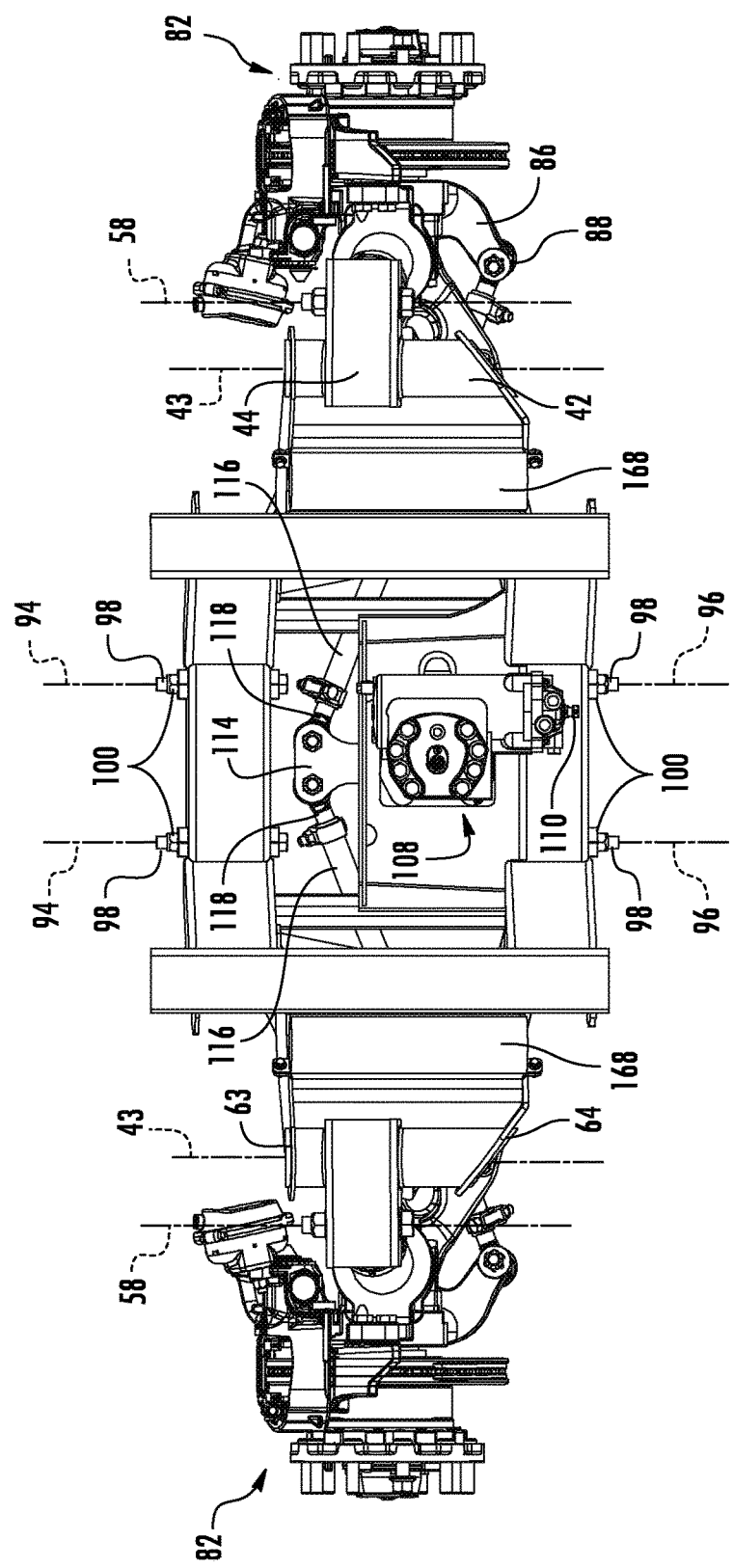
FIG. 2 is a top plan view of the IFS module of FIG. 1.
Figure 3:
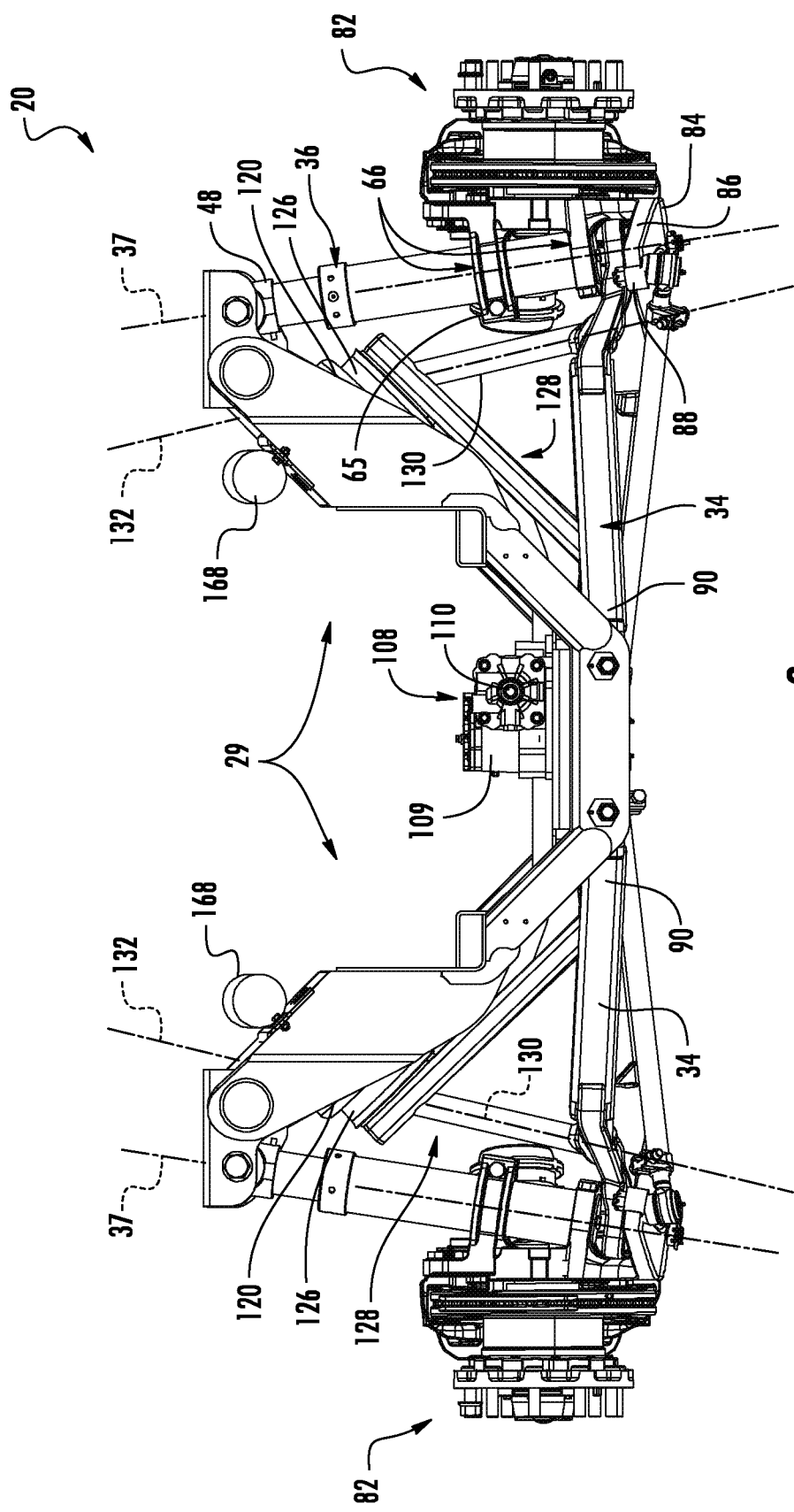
FIG. 3 is a rear elevation of the IFS module of FIG. 1.

The invention is adaptable to various modifications and alternative forms, and the specific embodiments thereof shown by way of example in the drawings are herein described in detail. The exemplary embodiments of the present disclosure are chosen and described so that others skilled in the art may appreciate and understand the principles and practices of the present disclosure. It should be understood, however, that the drawings and detailed description are not intended to limit the invention to the particular forms disclosed, but on the contrary, the intention is to cover all modifications, equivalents and alternatives falling within the spirit and scope of the present invention as defined by the appended claims.

FIGS. 1-8 depict an embodiment of IFS module 20 which is a free standing assemblage adapted for installation into a vehicle. IFS module 20 may be affixed to vehicle frame 22 shown in dashed lines in FIG. 1, for example. IFS module 20 includes chassis support structure 24 having right side 26 and left side 28 sharing substantially rigid chassis support structure first portion 29 to which is attached, or which forms a part of, right side IFS assembly 30 and left side IFS assembly 32. Alternatively, chassis support structure 24 or first portion 29 thereof may form an integral part of the vehicle to which right and left side IFS assemblies 30, 32 are installed directly, rather than through an IFS module such as IFS module 20. Chassis support structure 24 may be a stamped sheet metal and/or metal beam weldment formed of suitably rigid material. Chassis support structure right and left sides 26, 28 as shown are substantially mirror images of each other, in other words, chassis support structure 24 is substantially symmetrical about its lateral center, which coincides with the lateral center of the vehicle. Likewise, right and left side IFS assemblies 30, 32 as shown are substantially mirror images of each other. Unless indicated otherwise, structural and functional descriptions herein which specify neither chassis support structure right or left side 26, 28, nor right or left side IFS assembly 30, 32, or components thereof, should be construed to relate to the chassis support structure, IFS assembly and components of either side. Moreover, corresponding elements between the right and left sides have a common reference numeral and in the accompanying Figures, the element of only the right or left side element may be indicated.

In the depicted embodiment, each IFS assembly 30, 32 includes lower control arm 34, strut 36 which extends generally vertically along its strut axis 37, steering knuckle 38, and torque tube assembly 40. As shown, torque tube assembly 40 is an integrated part of the respective chassis support structure right or left side 26, 28, but may be a separate component affixed thereto. Torque tube assembly 40 is formed of an elongate torque tube 42 that extends fore and aft along generally horizontal axis 43, and laterally extending upper strut mount 44. Relative to chassis support structure first portion 29, torque tube 42 is secured at fixed forward joint 63 and aft joint 64 spaced along torque tube axis 43. As 63, 64 may be welds. Upper strut mount 44 has inboard end 45 affixed, as by welds, to torque tube 42 at a location between joints 63, 64, and outboard end 46 which extends laterally outward from inboard end 45 in a generally horizontal plane.

Strut upper end 48 and strut lower end 50 are disposed along strut axis 37, and have relative movement along and about strut axis 37. Strut upper end 48 is provided with steel clevis ring structure 52 that surrounds bushing 54. In the depicted embodiment, bushing 54 is a compliance bushing formed of elastomeric material such as vulcanized rubber surrounding and bonded to cylindrical steel sleeve 55 and/or the interior surface of clevis ring structure 52. Sleeve 55 is concentric with clevis ring structure 52, and compliance bushing 54 may be a component part of strut 36. Strut upper end 48 is pivotally secured to upper strut mount outboard end 46 with bolt 56 and nut 57. Bolt 56 extends along axis 58 through upper strut mount outboard end 46 and bushing sleeve 55. In the depicted embodiment, upper strut mount 44 is defined by an inverted U-shaped channel having spaced parallel forward flange 60 and aft flange 62 provided at outboard end 46 with apertures aligned along axis 58. Upper strut mount 44, strut upper end 48, and elongate bolt 56 thus define a clevis joint. The interior of bushing sleeve 55 is closely fitted about bolt 56 to resist rotation of strut upper end 48 with strut lower end 50, though a degree of compliance is obtained through elastic deformation of compliance bushing 54, generally in a plane perpendicular to strut axis 37. Strut upper end 48 also has a nominal position relative to chassis support structure 24 in which the axes of bolt 56, bushing sleeve 55 and clevis ring structure 52 are coincident with axis 58, and strut axis 37 is substantially perpendicular to axis 58. In the nominal, position, elastically deformable compliance bushing 54 is substantially undeformed. Deviation from the nominal position is the result of the compliance facilitated by elastic deformation of bushing 54. Deviation from the nominal position is typically caused by angular displacement of clevis ring structure 52 about strut axis 37 due to frictionally induced torque imparted on strut upper end 48 by strut lower end 50, at the onset of or during rotative movement of steering knuckle 38 about strut axis 37. In some embodiments, deviation from the nominal position may also be caused by strut 36 experiencing a bending moment in fore or aft directions generally parallel with axis 58.

Strut lower end 50 is fixed at two locations along strut axis 37 to strut supporting portion 66 of steering knuckle 38. Strut supporting portion 66 includes encircling clamp 65 which surrounds strut lower end 50 received therethrough, and boss 67 and mating bracket 68 located below encircling clamp 65. Each of boss 67 and bracket 68 is configured with a semi-cylindrical inner surface that engages the outer cylindrical surface of strut lower end 50. The semi-cylindrical inner surfaces of boss 67 and bracket 68 are provided with circumferentially extending, radially inwardly projecting ridges 70 that are received in cooperating circumferential groove 71 (FIGS. 9 and 10) provided in the cylindrical outer surface of strut lower end 50. Ridges 70 and groove 71 axially align strut lower end 50 relative to steering knuckle 38 and secure them against relative movement along strut axis 37. Frictional engagement between the cylindrical outer surface of strut lower end 50 and the interfacing cylindrical surfaces of encircling clamp 65, and the clamp defined by boss 67 and bracket 68, rotatably and axially fix strut lower end 50 to steering knuckle strut supporting portion 66. Bolts 72 hold bracket 68 and boss 67 together against strut lower end 50; bolt 72 and nut 73 hold encircling clamp 65 tightly closed upon strut lower end 50.

Certain embodiments of IFS module 20 are provided with components that may be included in IFS assembly 30, 32 as individually installed in a vehicle, or which may be installed subsequent to installation of the IFS assemblies 30, 32. Steering knuckle 38 includes caliper assembly mounts 74 and spindle 76, to which caliper assembly 78 and rotor 80 of disk brake assembly 82 are respectively attached. Rotor 80 as shown is provided with central heel mounting flange 81 provided with wheel mounting lugs 83 for attachment of the vehicle wheels (not shown). A portion of rotor 80 is disposed within caliper assembly 78 in a manner well-known to those having ordinary skill in the art, whereby caliper assembly 78 and rotor 80 are operatively engageable. As discussed herein below, IFS assembly 30, 32 maximizes the available wheel cut, i.e., the angle in either direction about strut axis 37 that a vehicle front wheel can be turned.

Figure 4:
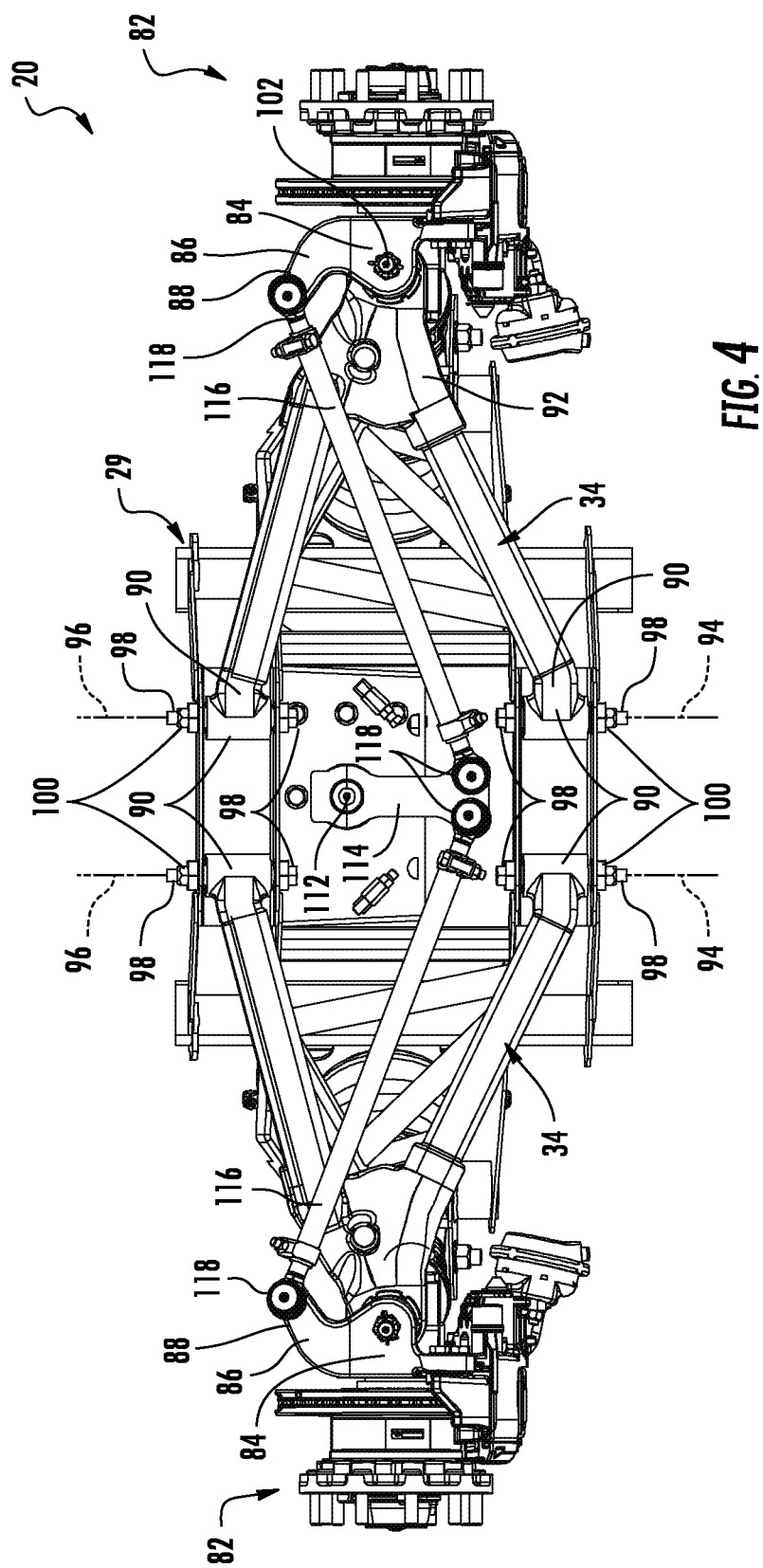
FIG. 4 is a bottom plan view of the IFS module of FIG. 1.
Figure 5:
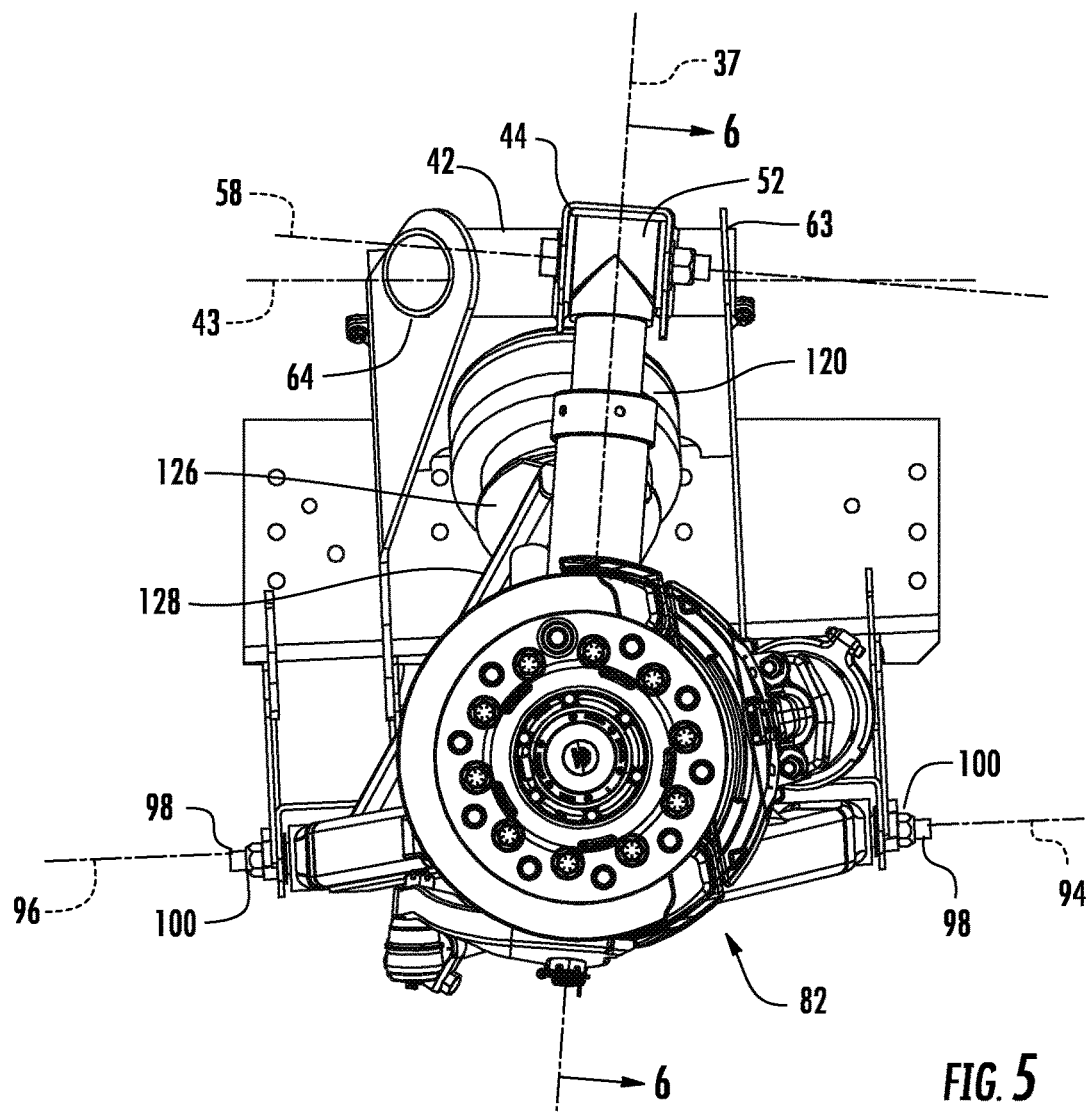
FIG. 5 is right side elevation of the IFS module of FIG. 1.
Figure 6:
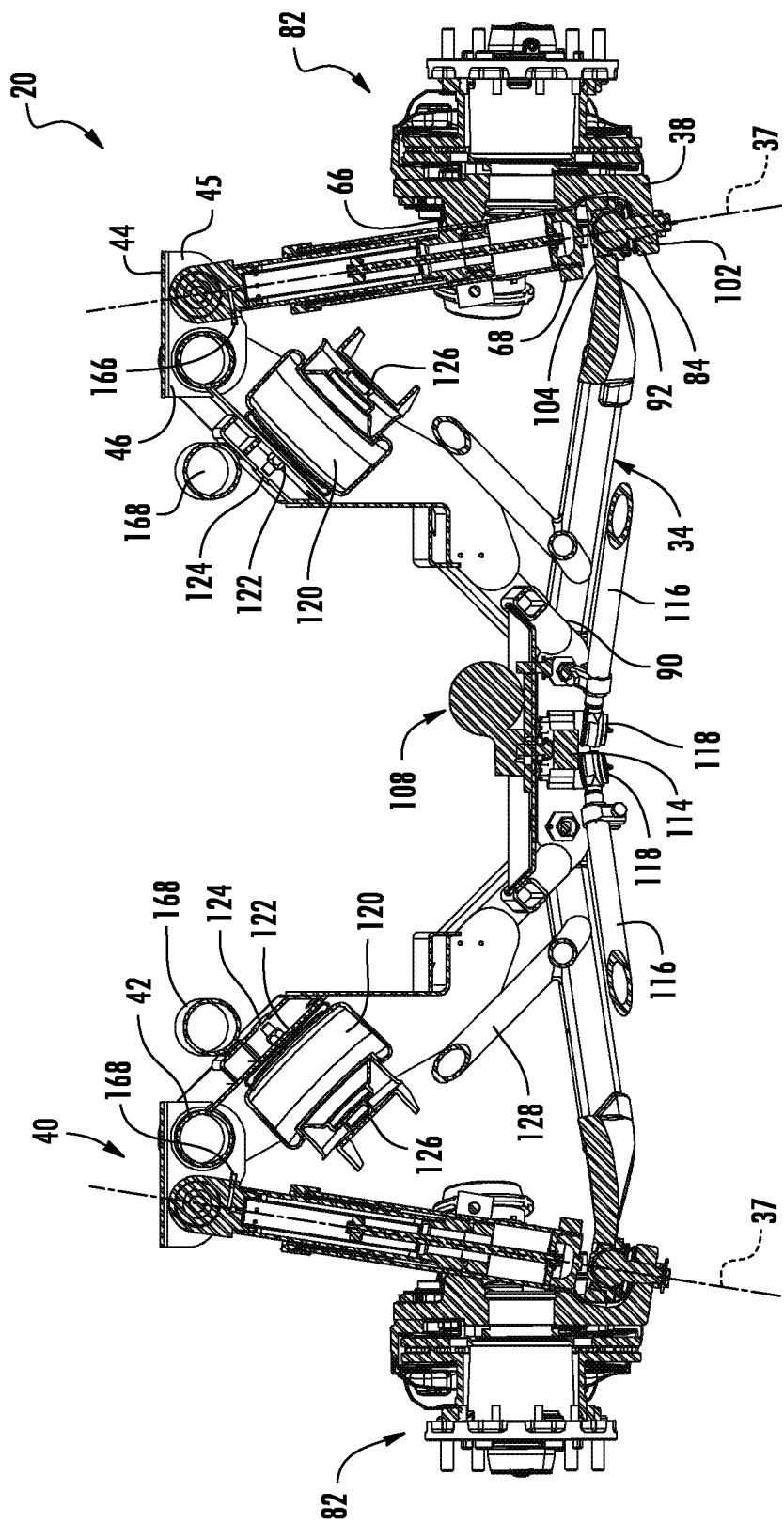
FIG. 6 is a partially sectioned view of the IFS module of FIG. 5 along line 6-6.

As perhaps best seen in FIGS. 4 and 6, steering knuckle 38 is provided with load arm 84 that extends laterally inwardly and below lower control arm 34, to which load arm is secured. Steering knuckle 38 also has elongate turning arm 86 which, in the depicted embodiment, extends rearwardly and laterally inwardly from load arm 84 to turning arm terminal end 88. Lower control arm 34 has laterally-spaced inboard and outboard ends 90, 92. Lower control arm inboard end 90 is pivotally secured to chassis support structure first portion 29 at a pair of locations that are spaced fore and aft. These pivotal attachments are about generally horizontal and parallel forward and aft axes 94, 96 that extend fore and aft, the attachments being made with bolts 98 and nuts 100, as perhaps best seen in FIG. 4.

Figure 7:
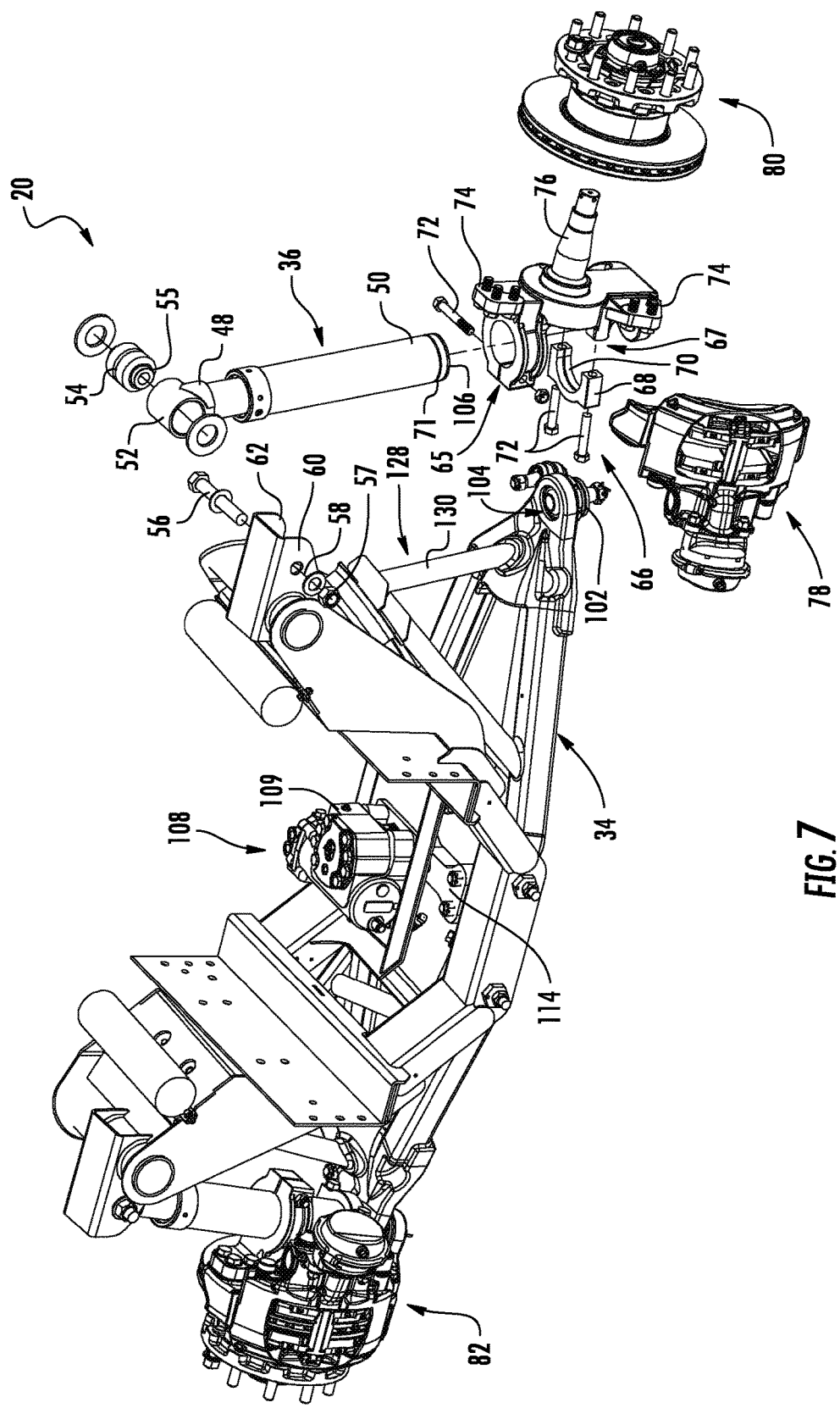
FIG. 7 is a partially exploded, front, upper perspective view of the IFS module of FIG. 1.
Figure 8:
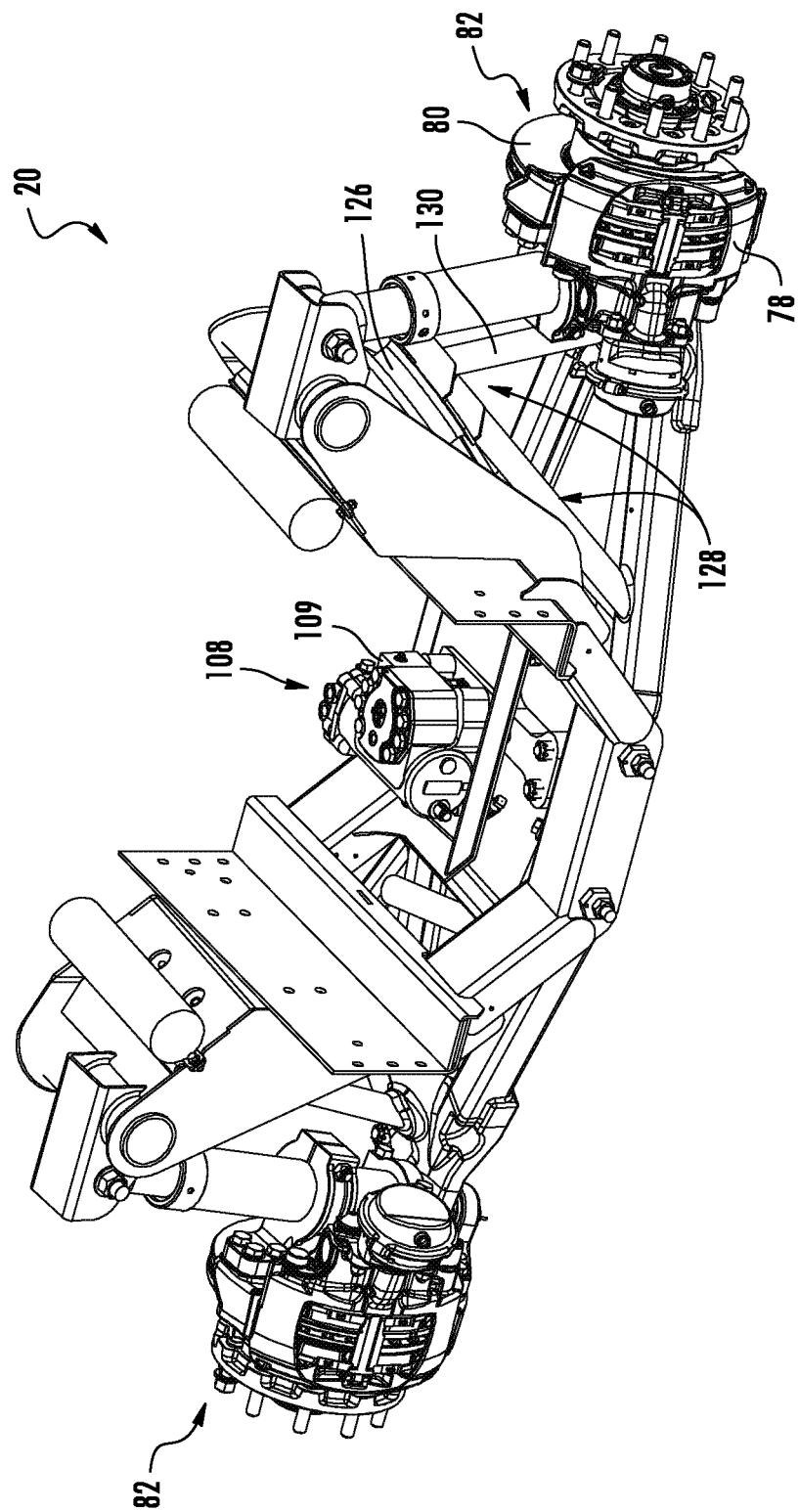
FIG. 8 is a front, upper perspective view of the IFS module of FIG. 1.

Lower control arm outboard end 92 is rotatably secured to, and is upwardly supported by, steering knuckle load arm 84 through interconnecting ball joint 102. Steering knuckle 38 thus places a compressive force onto ball joint 102 and lower control arm 34. Strut axis 97 extends through ball joint 102. Referring to FIGS. 6 and 7, lower control arm outboard end 92 has top surface 104 disposed above ball joint 102 and is superposed by strut axial end 106 defined by strut lower end 50. As noted above, strut lower end 50 is axially supported by steering knuckle strut supporting portion 66, and so strut axial end 106 is in spaced superposition with top surface 104. Thus, lower control arm outboard end 92 is sandwiched between strut 36 and steering knuckle load arm 84 along strut axis 37.

IFS module 20 includes steering box 108 having housing 109 secured to chassis support structure first portion 29 at a laterally central position between right and left side lower control arm inboard ends 90. Steering box 108 has rotatable input shaft 110 extending rearwardly from housing 109, the rearward end of input shaft 110 adapted to be rotatably connected to a steering shaft (not shown). Steering box 108 also has rotatable output shaft 112 downwardly extending through an aperture in chassis support structure first portion 29 at the lateral center of chassis support structure 24. Rotatable input and output shafts 110, 112 are operably coupled within housing 109 for corresponding rotation. Pitman arm 114 is rotatably secured to steering box output shaft 112 and converts angular movement of output shaft 112 to linear movement of a pair of elongate right and left side tie rods 116 each individually secured at one end to pitman arm 114 via an interconnecting tie rod end 118, as perhaps best seen in FIG. 4. Each tie rod 116 is secured at its opposite end to a turning arm terminal end 88 via an interconnecting tie rod end 118. Pitman arm 114, tie rods 116 and tie rod ends 118 thus form steering linkage between steering box 108 and turning arms 86, through which coordinated rotative movements of right and left side steering knuckles 38 about their respective strut axes 37 is accomplished, these rotative movements induced by rotation steering box input shaft 110 through steering box output shaft 112 and the steering linkage.

IFS module 20 and the IFS assemblies 30, 32 include a pair of right and left side air springs 120 operably disposed between the respective chassis support structure right or left side 26, 28 and the respective right or left side lower control arm 34. Each air spring 120 engages chassis support structure 24 at a respective right or left side location 122 at which the air spring is retained to chassis support structure 24 with threaded fastener 124. Chassis support structure 24 and air springs 120 are upwardly supported relative to lower control arms 34, and thus by steering knuckle load arms 84.

Air spring 120 is supported by lower air spring seat 126, which is supported by seat support structure 128 of lower control arm 34. Sea support structure 128 is located laterally between lower control arm inboard and outboard ends 90, 92, and projects upwardly relative thereto. Seat support structure 128 includes rigid strut member 130 which extends along longitudinal axis 132 between lower air spring seat 126 and a location on lower control arm 34 proximate its outboard end 92, as perhaps best seen in FIGS. 1 and 3. Steering knuckle 38 is disposed below lower air spring seat 126 and air spring 120, and rigid strut member longitudinal axis 132 diverges from strut axis 37 in an upward direction from lower control arm 34. Lower air spring seat 126, air spring 120, and rigid strut member 130 are thus located well out of the path of rotative movement of steering knuckle 38 and disk brake assembly 82 carried thereby, whereby rotative movement of steering knuckle 38 about strut axis 37 is unconfined by proximity between steering knuckle 38 and lower air spring seat 126 and/or air spring 120 is unconfined by proximity therebetween and available wheel cut is maximized. Moreover, a portion of disk brake assembly 82 carried by steering knuckle 38 is receivable beneath lower air spring seat 126 during rotative movement of steering knuckle 38 about strut axis 37.

Figure 9:
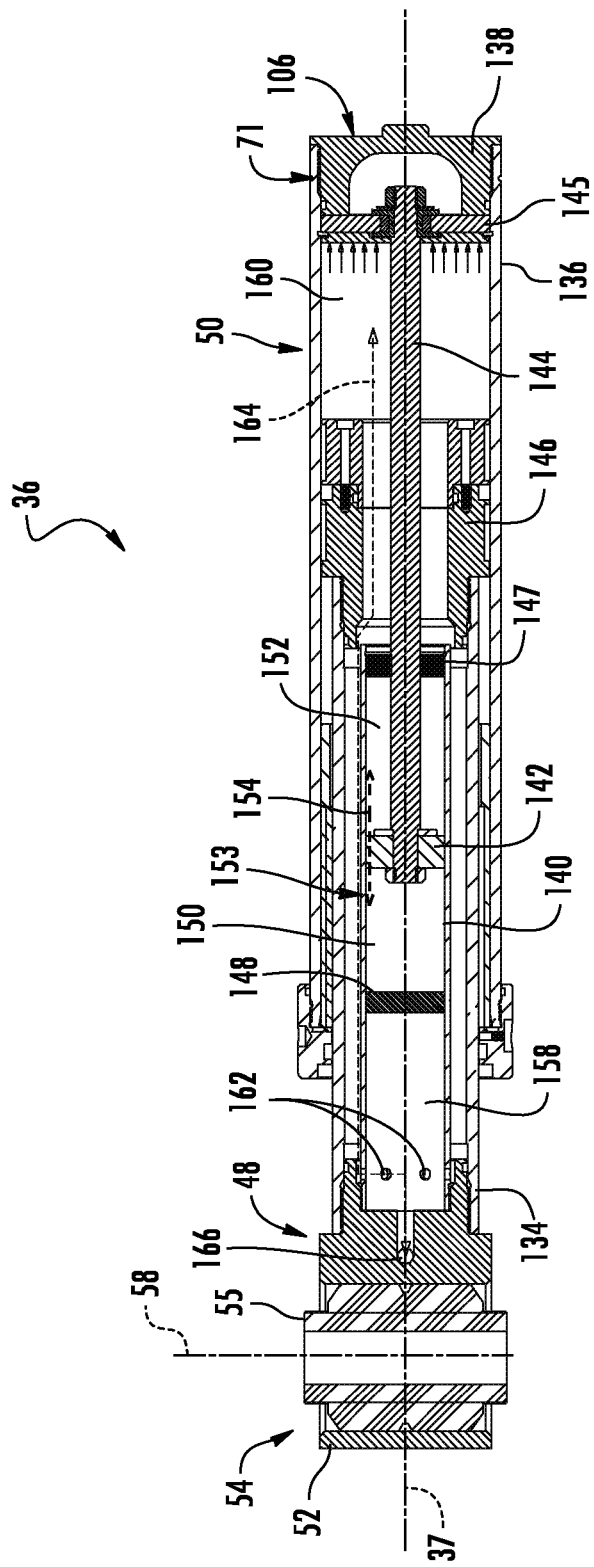
FIG. 9 is a longitudinal sectional view of a first embodiment strut used in an IFS assembly according to the present disclosure.
Figure 10:
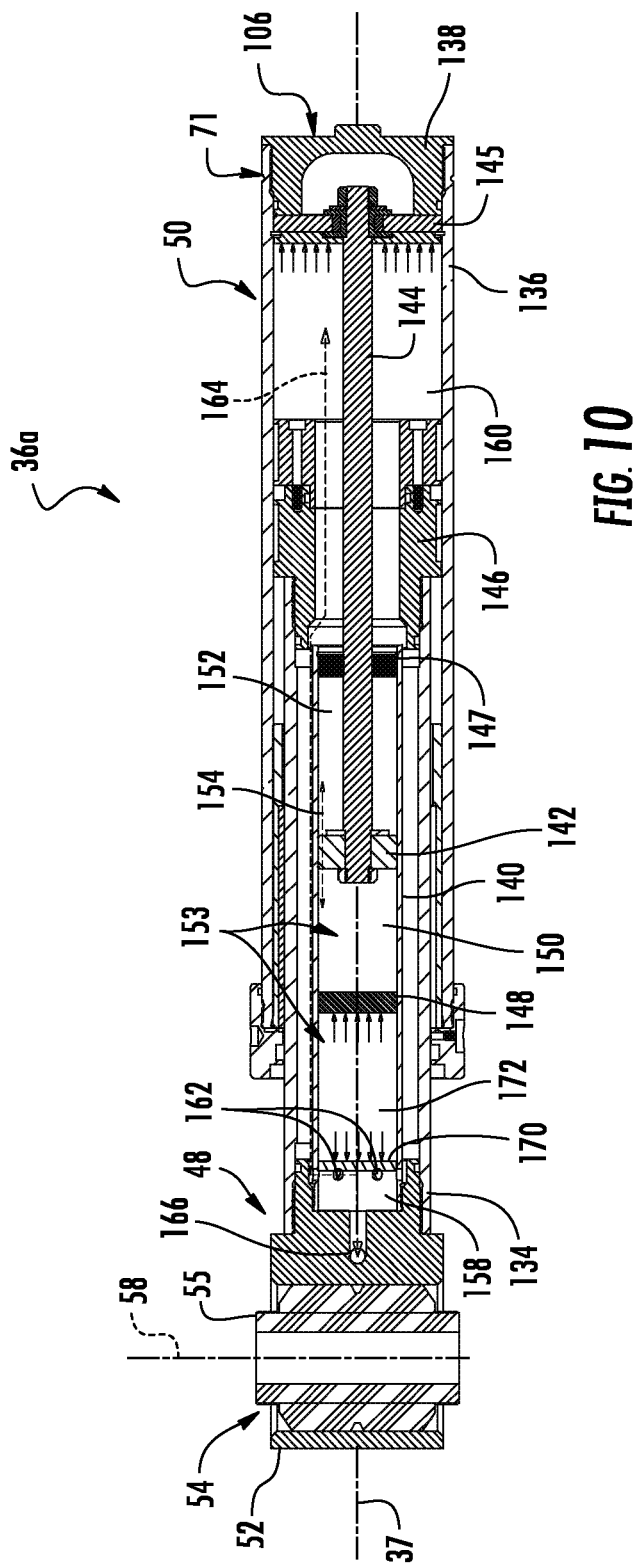
FIG. 10 is a longitudinal sectional view of a second embodiment strut used in an IFS assembly according to the present disclosure.

FIG. 9 shows the internal structure and further details of strut 36, and FIG. 10 shows the internal structure and details of alternative embodiment strut 36a, which may be substituted for strut 36. Except for distinctions between strut 36 and strut 36a. discussed below and revealed by a comparison between FIGS. 9 and 10, reference herein and in FIGS. 1-8 to strut 36 shall be understood to apply to and encompass strut 36a.. Additionally, it is to be understood that the horizontal orientation of struts 36, 36a. depicted in FIGS. 9 and 10 is merely to provide a larger view than obtainable by depicting them in a substantially vertical orientation, and does not alter the context used heretofore with respect to descriptors such as "upper" and "lower"; "above" and "below"; "top" and "bottom"; "vertical" and "horizontal"; and the like.

Referring to FIG. 9, strut upper end 48 is defined by cylindrical strut upper portion 134 and strut lower end 50 is defined by cylindrical strut lower portion 136. Strut upper and lower portions 134, 136 are telescopically engaged along strut axis 37, and respectively form a strut rod and a strut body. Strut lower portion 136 is sealably closed at its free end by end cap 138 that defines above-mentioned strut axial end 106. Above-mentioned clevis ring structure 52 is sealably fixed to the free end of strut upper portion 134. Concentrically disposed within strut upper portion 134 is cylindrical damper body 140, within which is slidably disposed annular damper valve 142, Damper valve 142 is affixed to one end of elongate damper rod 144 that extends therethrough. The opposite end of damper rod 144 is secured to plate 145 sealably fixed to the interior wall of strut lower portion 136 and relative to end cap 138. One end of cylindrical damper body 140 is sealably affixed to strut upper end 48; the opposite end of damper body 140 is affixed to sliding bearing member 146. The cylindrical space between the superposing cylindrical surfaces of strut upper portion 134 and strut lower portion 136 located above sliding bearing member 146 is vented to atmosphere. Sliding bearing member 146 is slidably disposed within cylindrical lower portion 136, and surrounds and moves axially along valve rod 144. Sealably surrounding valve rod 144 at the end of damper body 140 affixed to sliding bearing member 146, and located below the lower side of damper valve 142 is annular seal 147. Above the upper side of damper valve 142 is disk-shaped floating piston 148, slidably sealed to the inner diameter of damper body 140. First oil chamber 150 is defined between damper valve 142 and floating piston 148, and second oil chamber 152 is defined between damper valve 142 and annular seal 147, thereby defining internal monotube damper assembly 153 having controlled oil flow across damper valve 142 between first and second oil chambers 150, 152 along the path defined by arrow 154. Damper 153 is thus housed within strut upper and lower portions 134, 136 and dampens relative motion between strut upper and lower ends 48, 50 along strut t axis 37.

Also housed within strut upper and lower portions 134, 146 is gas spring 156, which may utilize high pressure nitrogen as the working fluid. Gas spring 156 includes first gas chamber 158 located in damper body 140 between clevis ring structure 52 and floating piston 148, and second gas chamber 160 located in strut lower portion 136 and sliding bearing member 146 annular seal 147 and plate 145. The pressurized nitrogen gas within gas spring 156 provides the biasing force that urges strut upper and lower ends 48, 50 apart along strut axis 37, and thus allows struts 39 to upwardly support chassis support structure 24 relative to steering knuckles 38. Additionally, the high pressure nitrogen gas within gas spring, which acts on the upper side of floating piston 148, prevents cavitation in the hydraulic oil of damper 153. First gas chamber 158 is provided with a circumferentially arranged plurality of orifices 162 through the cylindrical wall of damper body 140 proximate the axial end thereof. First and second gas chambers are in fluid communication along a path indicated by arrow 164, which extends through orifices 162, along the outer cylindrical surface of damper body 140, and about damper rod 144 within sliding bearing member 146. Above the axial end of cylindrical damper body 140, in clevis ring structure 52, strut upper end 48 is provided with gas port 166 adapted for connection with gas reservoir 168 externally of strut 36. IFS module 20 includes right and left side gas reservoirs 168 respectively mounted to chassis support structure right and left sides 26, 28. Each gas spring 156 is adapted to receive gas from and discharge gas to its connected gas reservoir 168, and is capable of containing gas at selectively variable pressures so as to compensate for different loads between the strut upper and lower ends 48, 50 and/or establish different nominal axial distances therebetween, thereby enabling changes to vehicle ride height and providing vehicle kneeling capabilities.

Referring now to FIG. 10, strut 36a. is substantially identical to strut 36 except for providing circular wall 170 sealably fixed within cylindrical damper body 140 just below orifices 162, and sealed, third gas chamber 172 within damper body 140 between wall 170 and floating piston 148. Third gas chamber 172 provides damper 153 with a sealed nitrogen charge which bears on the upper side of floating piston 148.

Forces imparted by the pressurized nitrogen in gas spring 156 urge strut upper and lower ends 48, 50 apart, and struts 36, 36a. therefore upwardly support chassis support structure 24. Struts 36, 36a. act in parallel with air springs 120 to upwardly support chassis support structure 24 and other portions of a vehicle's sprung weight relative to different portions of steering knuckles 38. Air springs 120 may thus be smaller than prior air springs operably disposed in series connection with struts or other springs, and positioned so as not to constrain rotative movement of the steering knuckles, maximizing available wheel cut.

While exemplary embodiments have been disclosed hereinabove, the present invention is not limited thereto. Instead, this application is intended to cover any variations, uses, or adaptations of the present disclosure using its general principles.

What is claimed is:

1. An IFS assembly comprising:
    a single lower control arm having laterally-spaced inboard and outboard ends, the inboard end adapted to be pivotally secured to a chassis support structure;
    a steering knuckle secured to the lower control arm outboard end;
    a strut having upper and lower ends disposed along a strut axis, the strut upper and lower ends having relative movement along and about the strut axis, the strut lower end fixed relative to the steering knuckle; and
    a torque tube assembly comprising:
        an elongate torque tube disposed along a torque tube axis and extending between first and second joints at which the torque tube is adapted to be rigidly fixed relative to the chassis support structure, and
        an upper strut mount having laterally-spaced first and second ends, the first end rigidly affixed to the torque tube between the first and second joints and the second end extending laterally from the torque tube, the strut upper end adapted to be pivotally secured to the second end whereby a rotational force is applied to said torque tube about said torque tube axis.

2. The IFS assembly of claim 1, wherein the upper strut mount comprises a pair of horizontally spaced flanges between which the strut upper end is receivable.

3. An IFS assembly comprising:
    a single lower control arm having laterally-spaced inboard and outboard ends, the inboard end adapted to be pivotally secured to a chassis support structure;
    a steering knuckle secured to the lower control arm outboard end;
    a strut having upper and lower ends disposed along a strut axis, the strut upper and lower ends having relative movement along and about the strut axis, the strut lower end fixed relative to the steering knuckle; and
    a torque tube assembly comprising:
        an enlongate torque tube extending between first and second joints at which the torque tube is adapted to be rigidly fixed relative to the chassis support structure, and
        an upper strut mount having laterally-spaced first and second ends, the first end rigidly affixed to the torque tube between the first and second joints, the strut upper end adapted to be pivotally secured to the second end; and,
    wherein the lower control arm inboard end is adapted to be pivotally secured to the chassis support structure about a first axis, the torque tube extends along a second axis, the strut upper end is adapted to be pivotally secured to the upper strut mount about third axis, and the first, second and third axes are generally parallel.

4. The IFS assembly of claim 3, wherein the first axis is laterally inboard of the second and third axis, and the second axis is laterally inboard of the third axis.

5. The IFS assembly of claim 3, wherein the second and third axes generally lie in a horizontal plane.

6. The IFS assembly of claim 5, wherein the first axis is below and generally parallel to the horizontal plane.

7. The IFS assembly of claim 1, further comprising a lower air spring seat supported by the lower control arm, the lower air spring seat adapted to upwardly support the chassis support structure relative to the lower control arm through an air spring engaging the chassis support structure.

8. The IFS assembly of claim 7, the strut is adapted to upwardly support the chassis support structure relative to the steering knuckle.

9. An IFS assembly comprising:
    a chassis support structure comprising a first portion and a torque tube assembly;
    a single lower control arm having laterally-spaced inboard and outboard ends, the inboard end pivotally secured to the chassis support structure first portion;
    a steering knuckle secured to the lower control arm outboard end;
    a strut having upper and lower ends disposed along a strut axis, the strut upper and lower ends having relative movement along and about the strut axis, the strut lower end fixed relative to the steering knuckle;
    wherein the torque tube assembly comprises:
        an elongate torque tube extending between first and second joints at which the torque tube is rigidly fixed relative to the chassis support structure first portion, and
        an upper strut mount having laterally-spaced first and second ends, the first end rigidly affixed to the torque tube between the first and second joints, the strut upper end pivotally secured to the second end; and, wherein the lower control arm inboard end is pivotally secured to the chassis support structure about a first axis, the torque tube extends along a second axis ,the strut upper end is pivotally secured to the upper strut mount about third axis, the strut upper end is pivotally secured to the upper strut mount about third axis, and the first ,second and third axes are generally parallel.

10. The IFS assembly of claim 9, wherein the upper strut mount comprises a pair of horizontally spaced flanges between which the strut upper end is disposed.

11. The IFS assembly of claim 9, wherein the first axis is laterally inboard of the second and third axes, and the second axis is laterally inboard of the third axis.

12. The IFS assembly of claim 9, wherein the second and third axes generally lie in a horizontal plane.

13. The IFS assembly of claim 12, wherein the first axis is below and generally parallel to the horizontal plane.

14. The IFS assembly of claim 9, further comprising a lower air spring seat supported by the lower control arm, the lower air spring seat adapted to upwardly support the chassis support structure relative to the lower control arm through an air spring engaging the chassis support structure.

15. The IFS assembly of claim 14, the strut is adapted to upwardly support the chassis support structure relative to the steering knuckle.

* * * * *

UNITED STATES PATENT AND TRADEMARK OFFICE
CERTIFICATE OF CORRECTION

PATENT NO.        : 9,550,401 B2
APPLICATION NO.   : 14/684721
DATED             : January 24, 2017
INVENTOR(S)       : John A. Hinz Page 1 of 1

It is certified that error appears in the above-identified patent and that said Letters Patent is hereby corrected as shown below:

In the Specification

Column 5, Line 25, delete "As" and insert --Joints--

Column 5, Line 34, delete "hushing" and insert --bushing--

Column 5, Line 58, delete "," and "nominal"

Column 6, Line 34, delete "heel" and insert --wheel--

In the Claims

Claim 9, Column 11, Lines 5-6, delete "the strut upper end is pivotally secured to the upper strut mount about third axis,"

Signed and Sealed this
Eighteenth Day of April, 2017

Michelle K. Lee
*Director of the United States Patent and Trademark Office*